United States Patent [19]

Nicklas et al.

[11] Patent Number: 4,981,156
[45] Date of Patent: Jan. 1, 1991

[54] TEMPERATURE AND VOLUME CONTROL VALVE ASSEMBLY

[75] Inventors: James R. Nicklas, Noblesville, Ind.; Robert D. MacDonald, Scottsdale, Ariz.

[73] Assignee: Masco Corporation of Indiana, Taylor, Mich.

[21] Appl. No.: 438,660

[22] Filed: Nov. 17, 1989

Related U.S. Application Data

[62] Division of Ser. No. 251,627, Sep. 30, 1988, Pat. No. 4,901,750.

[51] Int. Cl.[5] .............................................. F16K 31/60
[52] U.S. Cl. .................................... 137/270; 74/543; 137/637.3; 403/4
[58] Field of Search ...................... 137/270, 607, 637.3, 137/614.17; 74/543; 403/4; 29/401.1

[56] References Cited

U.S. PATENT DOCUMENTS

| | | | |
|---|---|---|---|
| 1,145,587 | 7/1915 | Hitchcock | 403/4 |
| 3,511,279 | 5/1970 | Hancock . | |
| 3,570,091 | 3/1971 | Doremus et al. | 29/401.1 |
| 3,625,255 | 12/1971 | Genín | 137/607 |
| 3,964,514 | 6/1976 | Manoogian et al. . | |
| 3,987,819 | 10/1976 | Scheuermann | 137/625.41 |
| 4,397,330 | 8/1983 | Hayman | 137/270 |
| 4,458,839 | 7/1984 | MacDonald . | |
| 4,876,783 | 10/1989 | Compion et al. | 29/401.1 |

Primary Examiner—Stephen M. Hepperle
Attorney, Agent, or Firm—Edgar A. Zarins; Malcolm L. Sutherland; Myron B. Kapustij

[57] ABSTRACT

A mixing valve (10) has a modular cartridge (60) rotatably mounted in housin (12). The cartridge has a bottom volume control valve plate (58) attached to a lower section (62) housing a pressure balance valve (80). The lower section (62) is secured to an upper section (120) that rotatably receives a temperature control plate (150). The plates (58) and (150) are both rotatable about a common axis (64). The plate (58) is controlled by operation of stem (180) attached to handle (34). The plate (150) is controlled by stem (160) which is operated by knob (38). An insert (250) allows the knob (38) to operate even when hot and cold water supplies are inverted. A splined hot water stop ring (228) sits in handle (34) and adaptably limits rotation of knob (38) for a selected maximum water temperature. Outer seals (58) assure that all water flows through cartridge (60) when the volume is set for partial flow.

7 Claims, 6 Drawing Sheets

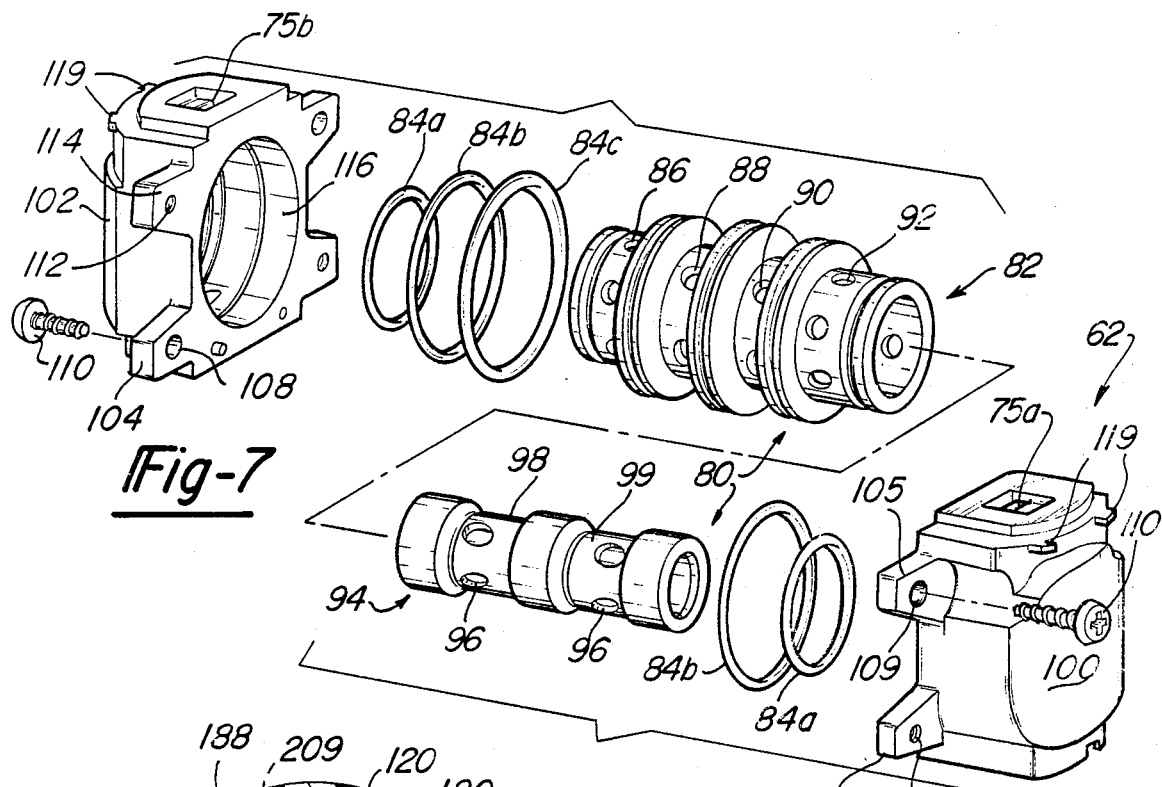
*Fig-7*
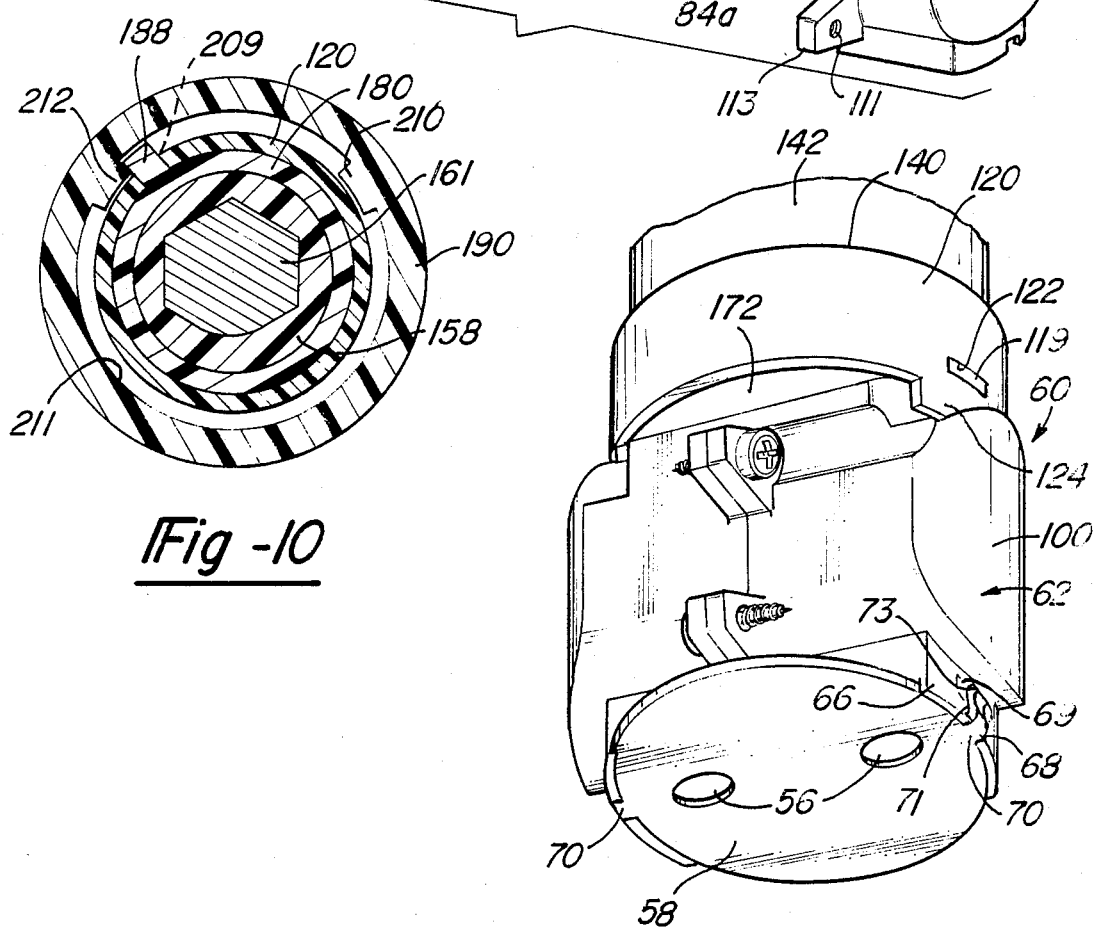
*Fig-10*
*Fig-4*

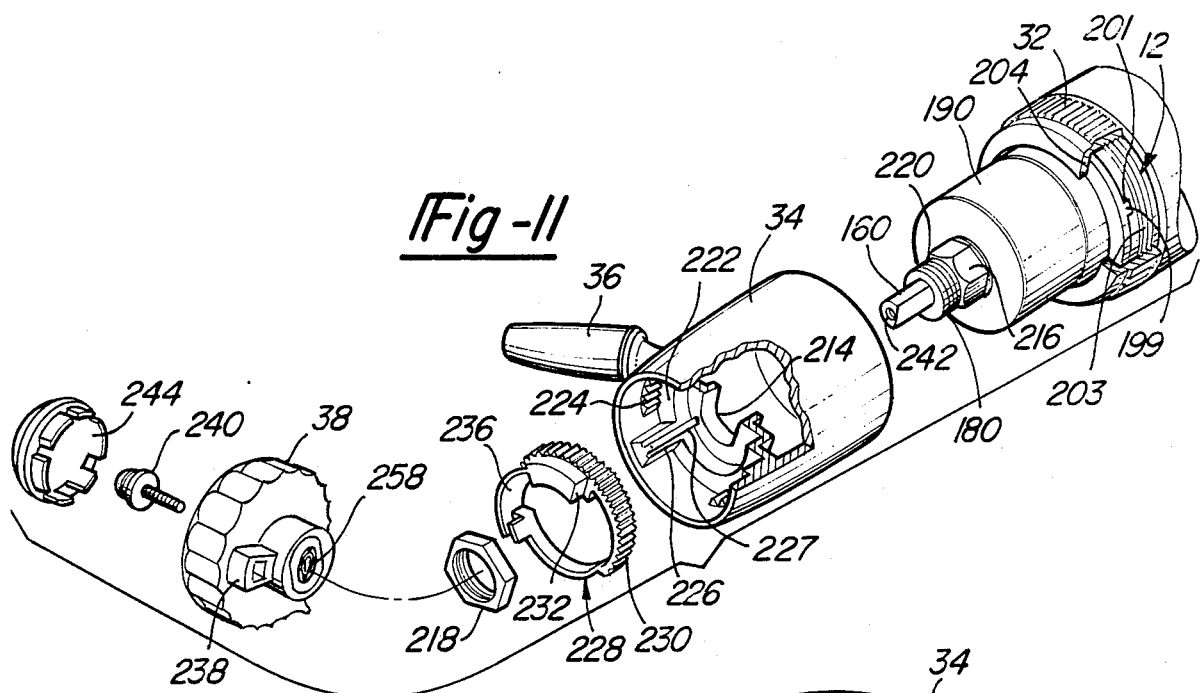
Fig-11
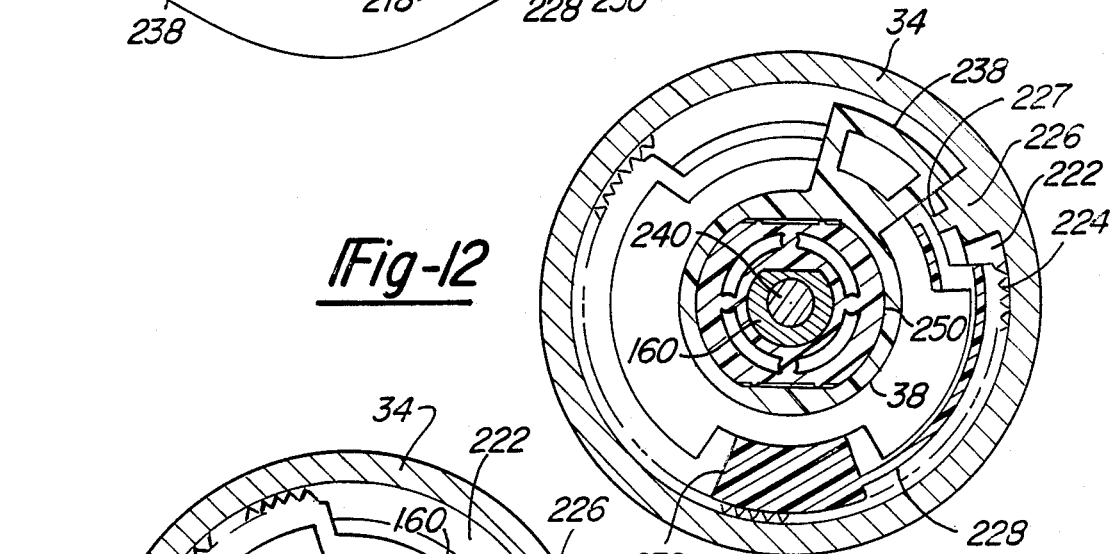
Fig-12
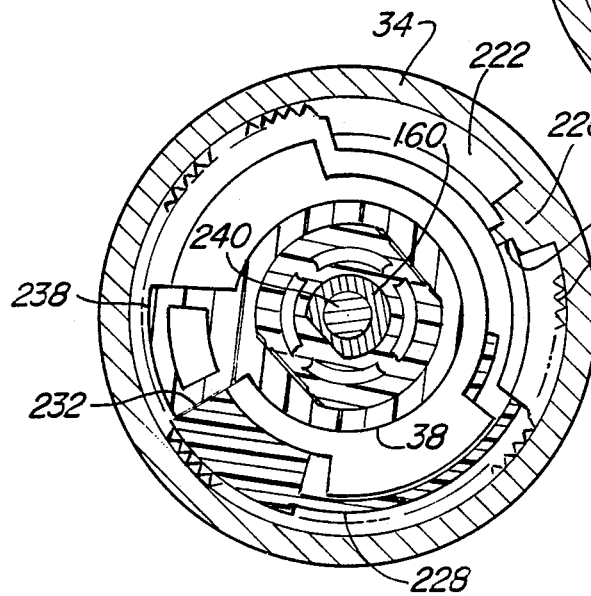
Fig-13
Fig-14

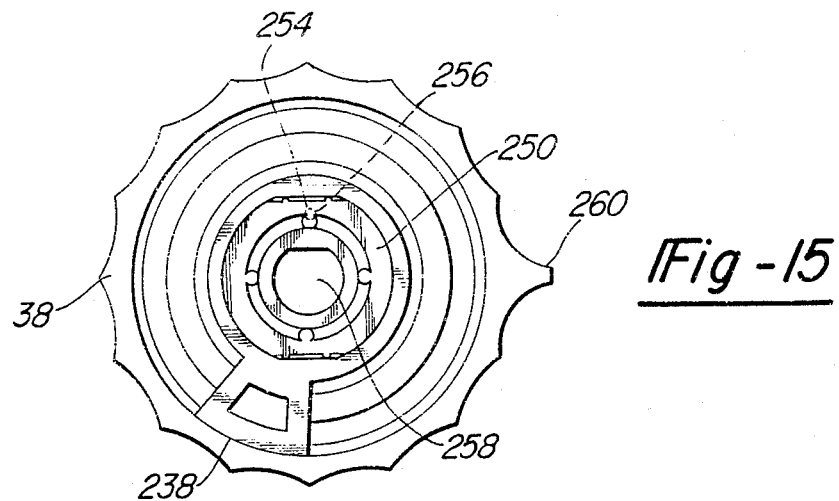
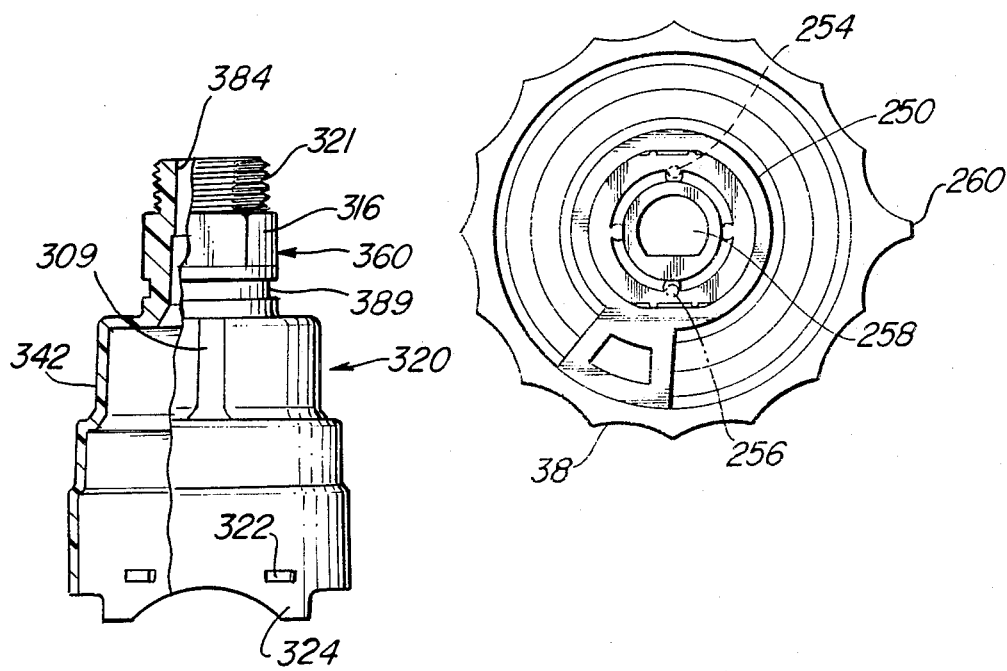

4,981,156

TEMPERATURE AND VOLUME CONTROL VALVE ASSEMBLY

This is a divisional of co-pending application Ser. No. 251,627, filed on Sept. 30, 1988, now U.S. Pat. No. 4,901,750.

TECHNICAL FIELD

The present invention relates to mixing valves for tub spouts and shower heads and more particularly to pressure balanced, volume controlled and temperature controlled mixing valves.

BACKGROUND OF THE INVENTION

Single handle mixing valves have become commonplace in today's plumbing market. However, many compromises have been built into mixing valves such as the compromises between large flow rates and easy temperature control. Furthermore, mixing valves are often built without pressure balance valves. Previous mixing valves that have been designed with a built-in pressure balance mechanism are bulky and not adequately packaged in a compact housing. However, lack of a pressure balance valve can result in rapid change of water temperature when either the hot water supply or the cold water supply pressure drops. The pressure drop can occur if another faucet, dishwasher, or washing machine is turned on, or a toilet is flushed. When either the cold or hot water supply pressure changes, discomfort can result if a person is taking a shower.

Furthermore, previous pressure balance valves have been complicated mechanisms that cannot be easily repaired or have its parts replaced.

What is needed is an easily assembled cartridge type mixing valve assembly which pressure balances the hot and cold water supply and provides full adjustment of the volume and temperature in a compact mixing valve housing having easily adjusted volume and temperature controls which work in the same fashion whether the hot and cold water supplies are attached to the mixing valve body in a normal or reversed fashion.

What is needed is a mixing valve that has its valve mechanisms housed in a cartridge that can be easily replaced when necessary.

SUMMARY OF THE INVENTION

In accordance with one aspect of the invention, the mixing valve for fluids includes a housing having a cavity with the first and second supply ports and a discharge port in communication with the cavity. The cavity receives a cartridge that is rotatably mounted in the housing on a longitudinal axis. The cartridge has a first generally planar valving surface substantially perpendicular to the axis of rotation sealingly abutting two supply ports for controlling volume flow through two respective inlets of the cartridge The cartridge has intermediate first and second ports downstream in communication with the respective inlets A second generally planar valving surface is slidably movable within the cartridge over the intermediate ports for controlling the relative proportion of the fluid flow from the two intermediate ports. Preferably, the second valving surface moves in a rotatable fashion about a longitudinal axis which preferably is the same axis about which the first valving surface rotates.

A first operating device controls the rotated position of the cartridge and consequently the first planar valving surface. A second operating device preferably rotates the second planar valving surface relative to the cartridge for adjusting the relative proportion of fluid flow from the first and second intermediate ports. Preferably a pressure balance mechanism is interposed between the first valving surface and the intermediate ports and is rotationally fixed within the cartridge so that it rotates with the cartridge within the cavity.

According to another aspect of the invention, inner seals are interposed between the respective supply ports and the first planar valving surface of the cartridge. An outer sealing means is interposed between the housing and the first valving surface and is operatively interposed between the supply ports and the discharge port and is spaced about the inner seals such that when the first valving surface is rotated to partially uncover the supply ports, the outer seal prevents fluid flow directly from the supply ports to the discharge port thereby preventing any fluid from bypassing the intermediate first and second ports so that all water must pass through the cartridge. Preferably the outer seal includes two annular rings that are positioned about the respective inner seals. The outer annular seals have a diameter sufficiently large to be spaced from the inner seals the diameter of the inlets through the first planar valving surface.

According to another aspect of the invention, the mixing valve has a volume control which is rotatable about the same longitudinal axis of rotation of the first planar valving surface and rotates the cartridge including the first valving surface. A temperature control knob is also mounted for rotation about the same longitudinal axis and controls the rotational position of the temperature adjustment valve surface. The rotatable knob has an interior stop shoulder for limiting rotational movement of the knob. The stop shoulder, when in the cold position, abuts a fixed shoulder in a seat within the volume control handle, and when in the adjusted hot position abuts an arcuate stop member which is adjustable to a variety of fixed positions adjacent the arcuate outer periphery of the seat within the volume control handle.

According to another aspect of the invention, the temperature control knob is mounted on an operating stem that is connected to a second valving surface for adjusting the temperature of the water with an orienting insert interposed between the operating stem and the temperature control knob to orient the knob with respect to the housing such that the knob is in a first position and moved to a second position to control the water flow from a cold temperature to an adjusted hot temperature independent of whether the first supply port is connected to a cold water supply and the second supply port is connected to a hot water supply or vice versa. Preferably the stem is radially asymmetric and the orienting insert has a socket complementarily shaped to receive the stem and the knob has a socket shaped to receive the orienting insert in the first or second rotated position. In addition, a positive engagement is integrally connected to the orienting insert to allow it to be mounted within the temperature control knob in only the first position when the hot and cold water supplies are normally positioned. The positive engagement is also removable to allow the orienting insert to be positioned in the second rotated position when the hot and cold water supplies are in an inverted or reversed position. In this way the temperature control knob maintains its same orientation and is rotated in the same direction and the same amount whether the hot and cold water supplies are normally positioned or inverted.

The combination of an adjustable stop member, the orienting insert, a cartridge assembly that houses the pressure balance mechanism having two rotational valving surfaces, one for volume control and a second within the cartridge for temperature adjustment, provides for an easily operated, compactly built, and consistently worked mixing valve that does not compromise on volume flow, temperature adjustment, ease of operation, ease of installation, and compensation for sudden pressure changes.

BRIEF DESCRIPTION OF THE DRAWINGS

Reference will now be made to the accompanying drawings in which

FIG. 3 is a top plan view of the valve housing member;

FIG. 4 is a fragmentary, bottom perspective view of the lower portion of the cartridge;

FIG. 7 is an exploded top perspective view of the lower cartridge section and its interior parts;

FIG. 8 is a cross-sectional view of the cartridge taken along the lines 8—8 shown in FIG. 2 with the temperature control valve plate in an intermediate position;

FIG. 9 is a view similar to FIG. 8 with the temperature control valve plate rotated to the cold position;

FIG. 10 is a cross-sectional view taken along the lines 10—10 in FIG. 2;

FIG. 11 is an exploded perspective and partially segmented view of the mixing valve illustrating the volume control handle, temperature control knob and their mounting on the respective stems of the mixing valve;

FIG. 12 is a cross sectional view taken along the lines 12—12 shown in FIG. 2 with the temperature control knob rotated to the cold position;

FIG. 13 is a view similar to FIG. 12 with the hot water stop member adjusted for a lowered maximum water temperature and the temperature control knob rotated to the maximum hot position against the stop member;

FIG. 14 is an exploded view of the temperature control knob and orienting insert;

FIG. 15 is a bottom plan view of the temperature control knob with the orienting insert in the standard configuration;

FIG. 16 is a view similar to FIG. 15 with the orienting insert in the temperature control knob in its inverted position; and FIG. 17 is a side elevation and partially segmented view of an alternate embodiment of the upper cartridge section and volume control stem.

DETAILED DESCRIPTION OF THE PREFERRED EMBODIMENT

Figure 1:
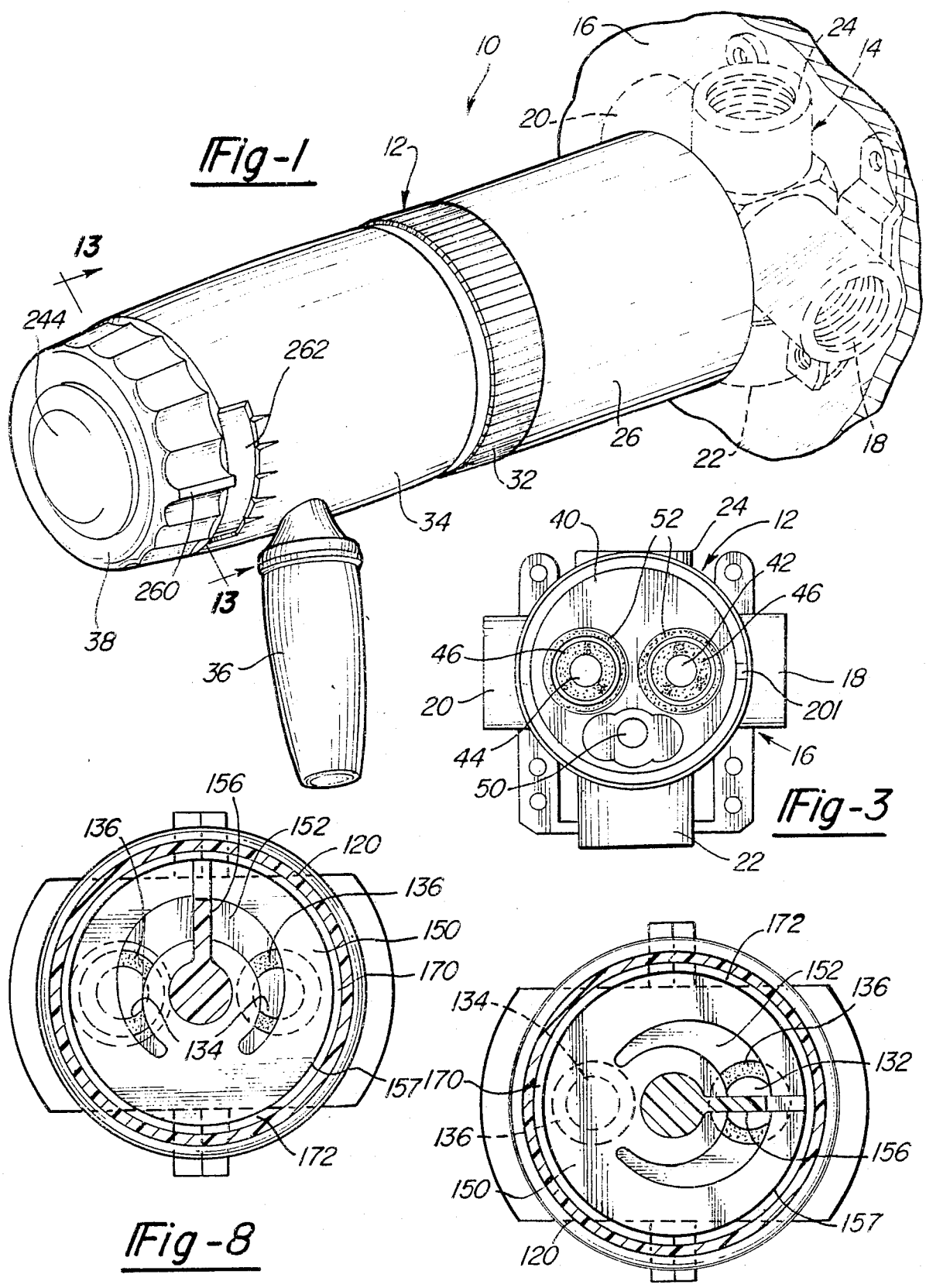
FIG. 1 is a perspective view of a mixing valve assembly according to the invention.
Figure 2:
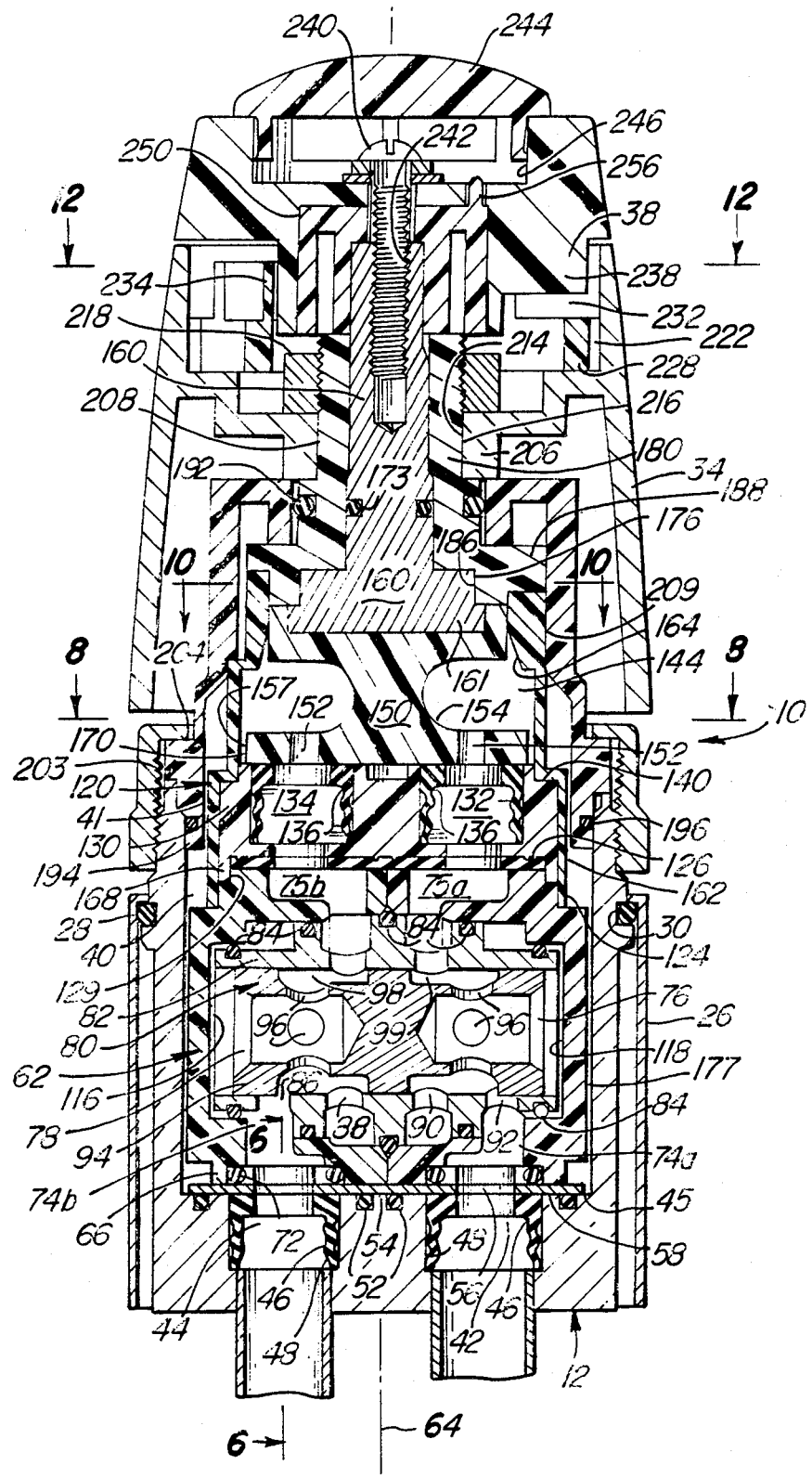
FIG. 2 is an elevational, segmented view of the valve assembly shown in FIG. 1.

Referring now to FIG. 1, mixing valve 10 has a housing 12 connected to fitting 14 which is usually mounted behind a shower wall 16. The fitting 14 has a cold water supply nipple 18 and a hot water supply nipple 20, and outlet nipple 22 leading to a tub spout (not shown) or outlet nipple 24 connected to a shower riser (not shown). Outlet nipple 24 is in fluid communication with outlet nipple 22. The body has a cosmetic collar 26 which is mounted as shown in FIG. 2 via a friction sealing ring 28 that is fitted in a groove 30 in housing 12. A collar 32 threadably engages the housing 12. A volume control handle 34 having a lever 36 is rotatable about a central longitudinal axis 64 through housing 12. Temperature control knob 38 is also rotatably mounted at the outer distal end of the volume control handle 34 and is rotatable about the same longitudinal axis 64. Knob 38 can also be referred to as a handle.

The internal valving is more clearly shown in FIGS. 2-10. For simplicity of reference, the temperature control knob 38 is located at the top of the mixing valve as illustrated in FIG. 2. All reference to top, bottom, upper and lower is made in reference to FIG. 2 even though its perfectly acceptable to mount the mixing valve in other orientations as illustrated in FIG. 1. Referring now to FIGS. 2 and 3, the housing 12 has a cavity 40 with a supply port 42 in communication with a water supply through nipple 18 and supply port 44 in communication with a water supply through nipple 20. The supply ports 42 and 44 pass through an end axial positioned wall 44 at the bottom of the cavity 40 and faces the open end 41 thereof. As shown in FIG. 2, inner sealing elements 46 are mounted in counterbores 48 of the two ports 42 and 44. A discharge port 50 also extends through the axially positioned wall 45 and in communication with the two outlet nipples 22 and 24.

Two outer sealing rings 52 are fitted into annular grooves 54 in the wall 45 and are positioned about the inner sealing elements 46 such that the outer sealing rings 52 are interposed between the ports 42 and 44 and discharge port 50. The outer sealing elements 52 are spaced from the inner sealing elements 46 substantially the diameter of the inlets 56 through a volume control valve plate 58.

Figure 6:
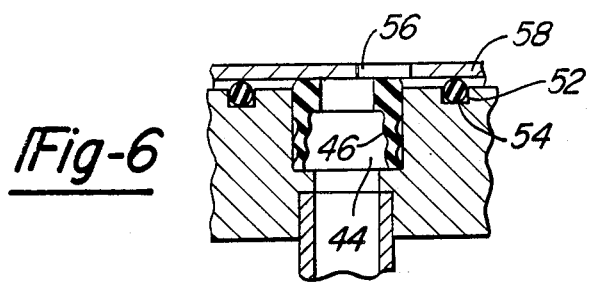
FIG. 6 is a fragmentary, cross-sectional view taken along the lines 6—6 in FIG. 2 with the volume control plate rotated to a partial on position.

The volume control valve plate, made from stainless steel, is affixed against rotation to a cartridge assembly 60 which is rotated by handle 34 as described later. The handle 34 as it rotates about axis 62 also rotates the cartridge about the longitudinal axis 62 such that the volume control plate 58 also rotates about an axis 62 such that inlets 56 can become full aligned with supply ports 42 as shown in FIG. 2 at the full on position or can be closed to a full off position. Furthermore in the intermediate partially on position between the full on and full off, outer seals prevent any water about inner seal 46 from reaching discharge port 50 without first passing through the cartridge 60 as explained below. In addition, cross flow between ports 42 and 44 is prevented. The outer sealing elements 52 effectively prevent water from bypassing cartridge assembly 60 is illustrated in FIG. 6.

Figure 5:
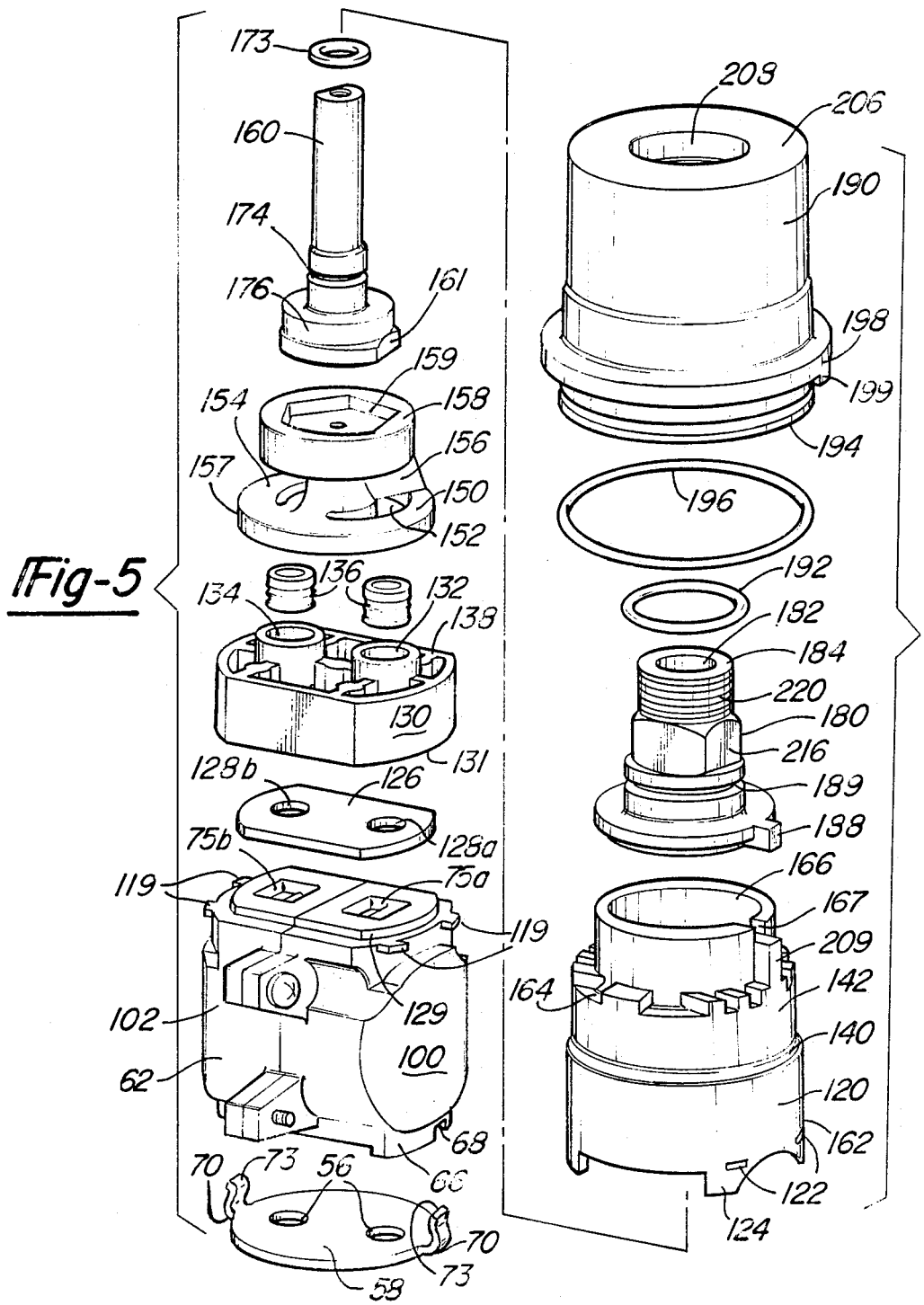
FIG. 5 is an exploded top perspective view of the cartridge, its interior members, valve stems and seals, and housing cap.

As shown in FIGS. 4 and 5, cartridge assembly 60 has a lower section 62 with two bottom end flanges 66 that have notches 68. A lateral groove 69 is spaced above notch 68 so that a retaining lip 71 is formed therebetween. The notches 68 receive corresponding tabs 70 in the volume control valve plate 58 to rotationally affix the volume control valve plate 58 to the cartridge assembly 60. The distal ends 73 of tabs 70 are bent upward and inward to be received in groove 69 so that the plate 58 is retained on section 62 via lips 71. As shown in FIG. 2, appropriate seal rings 72 are interposed between each inlet 56 and the valve housing lower section 62 to prevent leaking therebetween.

Referring now to FIG. 7, the lower section 62 has passages 74a and 74b leading to a first section 76 and second section 78, respectively, of a spool type pressure balance proportioning valve 80. The spool type valve 80 has an outer spool 82 with five sealing rings 84 about its outer circumference to fluidically seal passage 74a and passage 74b. The outer spool 82 has axially spaced apertures 86, 88, 90 and 92 aligned with the respective passages 74b, 75b, 75a and 74a. A sliding piston 94 also has apertures 96 therethrough which communicates sections 76 and 78 with respective grooves 98 and 99 which are in selective communication with the passages 74a, 74b and 75a and 75b via the apertures 86, 88, 90 and 92 in the outer spool. In this way the pressure within each passage 75a and 75b is substantially equalized via the movement of piston 94 of the spool type valve 80.

The lower section 62, for ease in manufacturing, is made from two halves 100 and 102 with each half having a flange 104 and 105 that has an aperture 108 and 109 that receives a threaded fastener 110 which is secured to the threaded apertures 111 and 112 in the flanges 113 and 114. Each half 100 and 102 has a cavity 116 and 118 sized to receive half of outer spool 82. Each half has a pair of laterally extending prongs 119 which snap fittingly are received into apertures 122 in a lower flange 124 of an upper cartridge section 120 as shown in FIG. 4.

Referring back to FIGS. 2 and 5, a gasket 126 has two apertures 128a and 128b in communication with passages 75a and 75b, respectively. The top portion of lower section 62 has a contoured shoulder 129 that receives a lower flange 131 of an intermediate cartridge section 130. The cartridge section 130 has two intermediate ports 132 and 134 therethrough in communication with respect to passages 75a and 75b. The gasket 126 prevents cross flow between the passages 75a and 75b. Two sealing elements 136 identical to sealing elements 46 are placed within the intermediate cartridge member 130. The upper end 138 of the intermediate cartridge member 130 abuts against an annular radially extending shoulder 140 in the upper cartridge section 120. A reduced diameter section 142 provides a mixing chamber 144 wherein the temperature control valve plate 150 is seated. The temperature control valve plate 150 has a valving surface with a crescent aperture 152 therethrough and an undercut 154 which allows the mixing of water therein. The crescent aperture 152 extends substantially over one hundred and eighty (180) degrees radially about the control valve plate 150. A supporting rib 156 extends within the undercut 154 to the outer periphery 157 of the temperature control valve plate 150. More than one rib 156 may be employed and circumferentially spaced about plate 150.

The temperature control valve plate 150 fits within reduced diameter section 142 of the upper cartridge section 140. The intermediate cartridge member 130 fits within larger lower section 162 of cartridge section 120. The plate 150 and member 130 are inserted from the lower end of the upper cartridge section 120. The upper end of the upper cartridge section 140 has a radially extending inner flange 164 to prevent the temperature control valve plate 150 from exiting through the top end 166. The gasket 126 is then seated within lower flange 131 of member 130 and the lower section 62 is snap fitted in place to upper section 140. Valve plate 58 is mounted within key notches 68 to form the modular cartridge assembly 60.

As shown in FIGS. 2, 8 and 9, the outer periphery 157 of valve plate 150 is sized to provide an annular clearance or passage 170 clearance with the reduced diameter section 142. The passage 170 is in communication with a discharge outlet 172 formed between the upper section 120 and lower section 62 of the cartridge assembly 60 as shown in FIG. 4. The discharge outlet 172 is in communication with the discharge port 50 via an annular chamber 177 formed about the lower section 62 within the cavity 40.

The cartridge assembly 60 is fitted within the open distal end 41 of cavity 40 so that plate 58 lays flat against seals 46 and 52. Referring back to FIGS. 2 and 5, an operating stem 160 is then positioned in seat 159 via its complementary shaped mating section 161. The seat 159 and section 161 may have rotationally asymmetric shapes or an eccentric pin and hole arrangement may be used to assure that stem 160 has only one orientation with respect to seat 159. An O-ring 173 is fitted within groove 174 of stem 160. The stem 160 also has a rounded seat section 176. An annular volume control stem 180 is then slipped over stem 160 via its central opening 182 and is in sealing engagement via sealing 0-ring 173 to prevent leakage therebetween. The seat section 176 rotatably seats in recessed seat 186 of stem 180 for allowing relative rotation of the volume control stem 180 with the temperature control stem 160. The temperature control stem 160 is longer than stem 180 so that it extends beyond the upper end 184 of stem 180. The stem 180 has a radially extending key 188 which fits within notch 167 in upper end 166 of the upper cartridge section 120. Rotation of stem 180 rotates the cartridge assembly 60. A sealing ring 192 fits within groove 189 about the stem 180.

In an alternate embodiment as shown in FIG. 17, the upper section 120 and volume control stem may be made as an integral upper cartridge and volume control stem member 320. Member 320 has rib 309 at reduced diameter section 342. The volume control stem section 360 has a threaded section 321, seat section 316, and groove 389 that receives seal 192. The temperature control stem 160 is mounted from lower end 324 that has aperture 322 that receives lower cartridge section 62 and extends through aperture 384. Use of member 320 will form a cartridge assembly that includes a volume control stem and a temperature control stem.

A housing cap 190 is then placed over the cartridge assembly 60. The housing cap 190 has an upper inwardly extending flange 206 and a central aperture 208 therethrough to allow the volume control stem 180 and temperature control stem 160 to extend therethrough. The O-ring 192 seals aperture 208 against leakage. The cap 190 has a lower sealing flange 194 which seats an O-ring 196 and has an outer flat seating flange 198 that has a key 199 that fits within a slot 201 at the open distal end 41 of the housing 12 as shown in FIG. 11. The housing 12 has a threaded section 203 which threadably secures the collar 32. The collar 32 has an inner flange 204 which abuts against the flange 198 of the cap 190 to secure the cap in place. Securement of the cap 190 in place maintains the cartridge 60, volume control stem 180, and temperature control stem 160 in an integrated assembled unit as shown in FIGS. 2 and Seal 196 prevents leakage between the housing 12 and cap 190.

As shown in FIG. 10, the cap 190 also has two internal longitudinal shoulders 210 and 212 which are about 90 degrees apart and are dimensioned to engage key 188 in the volume control stem 180 and an aligned rib 209 of upper cartridge section 120. A shoulder 211 is radially placed inward to interfere with rib 209 and key 188 so that the cap 190 cannot be incorrectly placed over cartridge 60 and to assure rib 209 and key 188 are between shoulders 210 and 212.

As shown in FIGS. 2 and 11, the stem 180 is rotated by handle 34 which has an asymmetric opening 214 shaped to snugly receive a complementary shaped section 216 of stem 180. A lock nut 218 can then be threaded onto the threaded section 220 of stem 180 to secure the handle 134 onto stem 180.

The handle 34 has an upper section with a seat 222 with a splined section 224 thereabout and an axially extending stop shoulder 226. A rib 227 radially extends inward from shoulder 226. An arcuate hot water stop ring 228 has a complementary splined section 230 which can adjustably be positioned and secured to the splined section 224 about a number of rotated positions. The ring 228 has a stop shoulder 232 and arcuate rib 236. The ring 228 abuts against rib 227 to be frictionally engaged in place in seat 222.

As shown in FIGS. 11–13, the stem 160 receives the temperature control knob 38 such that its stop shoulder 238 can rotate between the shoulder 226 on handle 34 and the stop shoulder 232 on member 228. A screw 240 threads into a hole 242 in stem 160 to secure the temperature control knob thereon. A cosmetic cap 244 fits within a recess 246 in temperature control knob 38.

Referring to FIG. 14, the temperature control knob 38 has an orienting insert 250 which fits within a lower recess 252 in the temperature control knob 38. A hole 254 extends axially above the recess 252. The insert 250 has a protrusion 256 which is positioned to be received within the hole 254. The insert 250 has a symmetrical shape so that it can be rotated 180 degrees with its prong 256 removed and positioned back into recess 252. The insert 250 has a rotatably asymmetrical aperture 258 which is D-shaped to fit onto the D-shaped temperature control stem 160 in one rotated position only. The aperture 258 does not extend all the way through insert 250. Only a smaller screw hole 259 extends through insert 250 so that insert 250 cannot be mounted upside down on stem 160.

Operation of the Valve

The valve cartridge 60 can be rotated to an off position such that the valve plate 58 has its inlets 56 totally misaligned with the supply ports 42 and 44 such that the inner seal elements 46 abut against the plate 58 and no water flows past the seals 46. When in the off position, the key 188 and rib 209 of cartridge section 120 abut rib 210 of cap 190. The handle 34 can be rotated counterclockwise so that the cartridge 60 is rotated away from rib 210 to any position up until key 188 and rib 209 abut rib 210 as shown in FIG. 10. The inlets 56 can be selectively partially aligned such as shown in FIG. 6 or can be fully aligned as shown in FIG. 2 with the supply ports 42 and 44. The inlets 56 are the same size and are positioned to provide the same amount of partial alignment simultaneously with respect to ports 42 and 44. In addition, during partial alignment, an outer sealing element 52 provide that all water passes through inlets 56 and prevents any water passing under the plate 58 directly to the discharge port 50 and prevents cross flow between ports 42 and 44.

Once the valve is open, cold and hot water, respectively, flow through passages 74a and 74b to the appropriate apertures 86 and 92 within spool 82. The water pressure within the two supply lines act upon the piston 94 to even the flow rate of the hot and cold water passing to the passages 75a and 75b via apertures 90 and 88, respectively. The water then flows to intermediate ports 132 and 134. Intermediate port 132 in communication with supply port 42 normally supplies cold water and intermediate port 134 in communication with supply port 44 normally supplies hot water. Flow past the intermediate ports 132 and 134 is controlled by the position of the temperature control valve plate 150 which can be rotated from a full cold position as shown in FIG. 9 with temperature control knob having its stop shoulder abutting stop shoulder 226 in the volume control handle 34 as shown in FIG. 12 counterclockwise so that the stop shoulder 238 now can abut stop 232 of arcuate member 228.

FIG. 8 discloses the temperature control valve plate in an intermediate position where it allows equal amounts of hot and cold water from the ports 132 and 134, respectively, via crescent aperture 152 in plate 150. Water is then mixed within the mixing chamber 144 and passes about the outer periphery 157 in passage 170 down through cartridge outlet 172. The water then flows about the lower section 62 through annular chamber 177 within the cavity 40 to the discharge port 50 at the end wall of the housing 12.

The maximum water temperature can be easily adjusted by removing cap 244 and unscrewing screw 240 so that temperature knob 38 is removed. The hot water stop ring 228 can then be removed, rotated and reinserted in the splined section 234 of handle 34. The splines 224 are sized such that rotation of the ring member 228 one notch or one spline will reduce the maximum water temperature approximately 2 degrees Fahrenheit. The position of ring 228 as shown in FIG. 13 reduces the counterclockwise rotation of the control knob 228 as compared to FIG. 12. Thus the maximum temperature of the water is also reduced. The adjustment of the maximum hot water temperature allowed via ring 228 can be achieved without shutting off the water supply to the housing 12 or major disassembly of the mixing valve 10.

Because the temperature control valve plate 150 is carried within the cartridge 60, rotation of the cartridge 60 carries, or rotates, the temperature control plate 150 therewith so that there is no temperature change as volume control handle 34 is rotated. The temperature control handle 38 also rotates with rotation of volume control handle 34. The temperature knob 38 can be independently rotated to independently move the valve plate 150 to adjust the temperature between the cold stop rib 226 and the hot stop shoulder 232 of member 228.

As described before, the normal configuration of the mixing valve is to have cold water enter port 42 from cold water nipple 18 and hot water entering port 44 from hot water nipple 20. It is also desirable for having the valve operate in the same fashion when the hot and cold water supplies are reversed so that hot water enters the nipple 22 and goes into supply port 42 and cold water goes through the supply nipple 20 into supply port 44. In other words, it is desirable that the temperature control knob 38 is still rotated counterclockwise from the normal full cold position to an intermediate mix or hot position.

With the present construction, it can easily be done by again removal of cosmetic cap 244 and removal of temperature control knob 38 by unscrewing screw 240. The stem 160 can then be rotated one hundred and eighty (180) degrees. The orienting insert 250 can then be removed from the temperature control knob 38. Its protrusion 256 is removed. The insert 250 is rotated the one hundred and eighty (180) degrees and reinserted within the recess 250. The temperature control knob 38 is then remounted onto the stem 160. Because both the orienting insert 250 and the stem 160 have been rotated one hundred and eighty (180) degrees, the knob 38 is in the same position as before with its stop shoulder 238 between abutting the rib 226 of volume control handle 34 and the stop rib 232 of the hot water stop ring 228. However, the crescent 152 of the temperature control plate 150 is initially over only intermediate port 134 which now supplies cold water and rotation of it counterclockwise will then cause the intermediate port 132 which now supplies the hot water to gradually become uncovered while slowly covering up intermediate port 134 to adjust the temperature of the water from cold to hot as knob 38 is rotated counterclockwise.

The protrusion 256 provides for a standard orienting of insert 250 and provides assembly only in the standard fashion with adjustment only being intentionally done when the ports 44 and 42 are interchanged so that they are supplying hot and cold water in a reverse fashion from the ordinary mode. The reversed position of the insert 250 is shown in FIG. 16 with the standard configuration shown in FIG. 15. The temperature pointer 260 of the temperature control knob 38 as illustrated points to the same place regardless of the position of orienting insert 250. As such, a single temperature scale 262 can be stamped, printed or decaled onto the volume control handle 34. Furthermore, the stop shoulder 238 on knob 38 is also in the same position so that the function of the knob 38 appears to remain the same to an operator.

Furthermore, if pressure in the cold or hot water line suddenly drops, the pressure balance valve 80 immediately responds to the pressure drop to maintain the same relative flow rates through both inlets 56 in the volume control valve plate The pressure balance valve 80 prevents sudden temperature changes due to pressure changes within the hot and cold water supply lines that can be caused by diversion of some of the hot or cold water.

The present invention provides for a reliable, compact, and versatile valve assembly that has pressure balancing, volume control, and temperature control. The mixing valve is controlled by two coaxially mounted handles that are conveniently placed at the end of the valve assembly. Furthermore, the maximum hot water temperature which can be achieved through control of the temperature control knob can be conveniently adjusted without disassembly of the cartridge or mixing valve housing. Furthermore, the mixing valve is suitable for back-to-back installations or other installations where the valve will receive hot and cold water in a reverse fashion with the valve being capable of having the same operation in spite of the fact that the hot and cold water supplies are reversed. Furthermore, maintenance of the mixing valve is easy with replacement of the modular cartridge being available rather than labor intensive disassembly of all of the valve parts.

Variations and modifications of the present invention are possible without departing from the spirit and scope as defined in the appended claims.

We claim:

1. A rotatable handle assembly for a mixing valve characterized by:
    an orienting insert having a socket having a rotational asymmetric shape to receive a complementary shaped stem at only one rotated orientation;
    a handle having a socket portion shaped to receive said orienting insert in a first or second rotated position;
    one of said orienting insert and handle having a positive engaging means frangibly connected thereto for limiting the reception of the orienting insert to said first rotated position and being frangibly removable so that said orienting insert can be received in said socket in said second rotated position.

2. A rotatable handle assembly as defined in claim 1 further characterized by:
    said positive engaging means including an axially extending protrusion integrally formed with said orienting insert and an axially extending hole in said handle shaped and positioned to receive said protrusion with said protrusion being frangibly removable from said orienting insert.

3. A rotatable handle assembly for a fluid mixing valve, said handle assembly characterized by:
    a control handle member for being mounted onto a stem of said mixing valve;
    a rotatable knob operably mounted onto said control handle member;
    said rotatable knob having a stop shoulder means for limiting the rotational movement of said knob relative to said control handle member;
    a seat means in the control handle member having an arcuate periphery and a fixed shoulder for abutting the stop shoulder means on the knob for limiting the rotation of the knob to a first position;
    said stop shoulder means abutable against a shoulder on an arcuate stop member, said arcuate stop member being adjustably positioned adjacent said outer periphery of said seat means for adjusting the rotational limit of said knob to a second position.

4. A handle assembly for a mixing valve, said handle assembly characterized by:
    a control handle member for being mounted onto a stem of said mixing valve;
    a rotatable knob operably seated on said control handle member;
    said rotatable knob having a stop shoulder means for limiting the rotational movement of said knob;
    a seat means having an arcuate periphery and a fixed shoulder for abutting the stop shoulder means on the knob for limiting the rotation of the knob to a first position;
    said stop shoulder means abutable against a shoulder on an arcuate stop member; and
    said arcuate stop member having an outwardly facing engagement means on an outer periphery being adjustably engageable to an inner facing engagement means on the arcuate periphery of said seat means for adjusting the rotational limit of said knob to a second position.

5. A handle assembly as defined in claim 4 further characterized by:
    said outwardly facing engagement means includes an externally splined periphery on said arcuate stop member and said inner facing engagement means includes an internally splined seat means.

6. A handle assembly as defined in claim 4 further characterized by:
    an orienting insert having a socket having a rotational asymmetric shape for receiving a complementary shaped stem of said mixing valve at only one rotated orientation;
    said rotatable knob having a socket portion shaped to receive said orienting insert in a first or second rotated position;
    one of said orienting insert and knob having a positive engaging means frangibly connected thereto for limiting the reception of the orienting insert to said first rotated position and being frangibly removable so that said orienting insert can be received in said socket in said second rotated position.

7. A handle assembly as defined in claim 6 further characterized by:
    said positive engaging means including an axially extending protrusion integrally formed with said orienting insert and an axially extending hole in said knob shaped and positioned to receive said protrusion with said protrusion being frangibly removable from said orienting insert.

* * * * *